United States Patent
Skweres

(10) Patent No.: US 11,014,585 B2
(45) Date of Patent: May 25, 2021

(54) ECP OVERLAY SYSTEM FOR W-TYPE TRIPLE VALVE

(71) Applicant: Westinghouse Air Brake Technologies Corporation, Wilmerding, PA (US)

(72) Inventor: Jeffrey B. Skweres, McKeesport, PA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 217 days.

(21) Appl. No.: 16/174,690

(22) Filed: Oct. 30, 2018

(65) Prior Publication Data

US 2019/0144017 A1    May 16, 2019

Related U.S. Application Data

(60) Provisional application No. 62/587,106, filed on Nov. 16, 2017.

(51) Int. Cl.

| | |
|---|---|
| *B60T 13/66* | (2006.01) |
| *B61H 13/34* | (2006.01) |
| *B60T 15/18* | (2006.01) |
| *B60T 15/02* | (2006.01) |
| *B60T 17/22* | (2006.01) |
| *B60T 17/04* | (2006.01) |
| *B61H 13/20* | (2006.01) |

(52) U.S. Cl.
CPC ............ *B61H 13/34* (2013.01); *B60T 13/662* (2013.01); *B60T 15/027* (2013.01); *B60T 15/184* (2013.01); *B60T 17/043* (2013.01); *B60T 17/228* (2013.01); *B61H 13/20* (2013.01)

(58) Field of Classification Search
CPC ....... B61H 13/34; B61H 13/20; B60T 13/662; B60T 13/665; B60T 15/027; B60T 15/184; B60T 17/043; B60T 17/228
See application file for complete search history.

(56) References Cited

U.S. PATENT DOCUMENTS

| | | | |
|---|---|---|---|
| 4,598,953 | A | 7/1986 | Wood et al. |
| 4,652,057 | A | 3/1987 | Engle et al. |

(Continued)

FOREIGN PATENT DOCUMENTS

| | | |
|---|---|---|
| AU | 1986061599 | 8/1986 |
| AU | 663443 | 10/1995 |

(Continued)

*Primary Examiner* — Thomas W Irvin
(74) *Attorney, Agent, or Firm* — John P. Darling; The Small Patent Law Group, LLC

(57) ABSTRACT

An ECP overlay system for a W-type triple valve includes a manifold body having a pipe bracket face configured to engage a face of a pipe bracket of a vehicle brake system, a valve face configured to engage a face of a W-type triple valve of a vehicle brake system, and an electric manifold face. The system also includes an electric manifold assembly engaged with the electric manifold face of the manifold body, with the electric manifold assembly having a pneumatic mode here the electric manifold assembly is configured to allow pneumatic-only control of a brake cylinder of vehicle brake system and an ECP mode where the electric manifold assembly is configured to allow electronic control of a brake cylinder of a vehicle brake system.

18 Claims, 11 Drawing Sheets

(56) References Cited

U.S. PATENT DOCUMENTS

| | | | |
|---|---|---|---|
| 5,335,974 A | 8/1994 | Klink | |
| 5,393,129 A | 2/1995 | Troiani et al. | |
| 5,503,467 A | 4/1996 | Gaughan | |
| 5,676,431 A | 10/1997 | McLaughlin et al. | |
| 5,730,504 A | 3/1998 | Gaughan | |
| 5,738,417 A | 4/1998 | Wood et al. | |
| 5,746,484 A | 5/1998 | Gaughan et al. | |
| 5,813,730 A | 9/1998 | Force | |
| 5,881,768 A | 3/1999 | Bezos et al. | |
| 5,967,620 A | 10/1999 | Truglio et al. | |
| 5,984,427 A | 11/1999 | Kettle, Jr. | |
| 5,988,766 A | 11/1999 | McCurdy, Jr. | |
| 6,024,419 A | 2/2000 | Waldrop et al. | |
| 6,035,250 A | 3/2000 | Newton et al. | |
| 6,039,409 A | 3/2000 | Engle | |
| 6,086,163 A | 7/2000 | Klink et al. | |
| 6,120,109 A | 9/2000 | Wood et al. | |
| 6,126,247 A | 10/2000 | Paul et al. | |
| 6,142,442 A | 11/2000 | Carroll | |
| 6,189,980 B1 | 2/2001 | Kull | |
| 6,213,565 B1 | 4/2001 | Hart | |
| 6,217,126 B1 | 4/2001 | Kull | |
| 6,318,812 B1 | 11/2001 | Newton et al. | |
| 6,375,277 B1 | 4/2002 | Carroll | |
| 6,416,034 B1 | 7/2002 | Sich | |
| 6,422,531 B1 | 7/2002 | Sich | |
| 6,457,782 B1 | 10/2002 | Truglio et al. | |
| 6,472,769 B1 | 10/2002 | Long, Jr. et al. | |
| 6,474,748 B1 * | 11/2002 | Cunkelman | B60T 11/326 |
| | | | 303/15 |
| 6,484,085 B2 | 11/2002 | Marra et al. | |
| 6,508,519 B1 | 1/2003 | Tate | |
| 6,520,599 B2 | 2/2003 | Wood et al. | |
| 6,626,506 B2 | 9/2003 | Kettle, Jr. | |
| 6,676,229 B1 | 1/2004 | Marra et al. | |
| 6,839,664 B1 | 1/2005 | Kull | |
| 6,964,456 B2 | 11/2005 | Root | |
| 6,964,457 B2 | 11/2005 | Kettle, Jr. | |
| 6,979,061 B1 | 12/2005 | Lumbis et al. | |
| 7,144,090 B2 * | 12/2006 | Kull | B60T 13/683 |
| | | | 303/118.1 |
| 7,240,970 B2 | 7/2007 | Reynolds et al. | |
| 7,357,463 B2 | 4/2008 | Barberis et al. | |
| 8,049,608 B2 | 11/2011 | Gaughan | |
| 8,226,174 B2 | 7/2012 | Wright | |
| 9,327,701 B2 * | 5/2016 | Sich | B60T 15/021 |
| 9,421,960 B2 | 8/2016 | Grasso et al. | |
| 9,481,348 B2 | 11/2016 | Wolf | |
| 9,481,350 B2 * | 11/2016 | White | B60T 17/04 |
| 10,214,195 B1 * | 2/2019 | Skweres | B60T 17/228 |
| 2005/0099061 A1 | 5/2005 | Hollandsworth et al. | |
| 2009/0229932 A1 | 9/2009 | Reynolds et al. | |
| 2011/0126732 A1 | 6/2011 | Lumbis et al. | |
| 2013/0248031 A1 * | 9/2013 | Sich | B60T 15/021 |
| | | | 137/624.27 |
| 2014/0049037 A1 | 2/2014 | White et al. | |
| 2016/0082939 A1 | 3/2016 | Cole | |
| 2016/0096517 A1 | 4/2016 | Burgess et al. | |
| 2019/0023254 A1 * | 1/2019 | Skweres | B60T 15/027 |
| 2019/0061730 A1 * | 2/2019 | Skweres | B60T 17/228 |
| 2019/0144017 A1 * | 5/2019 | Skweres | B61H 13/34 |
| | | | 303/15 |
| 2019/0144018 A1 * | 5/2019 | Plechey | B60T 15/184 |
| | | | 303/15 |
| 2020/0198613 A1 * | 6/2020 | Skweres | B60T 15/36 |
| 2020/0207323 A1 * | 7/2020 | Skweres | B60T 8/1705 |

FOREIGN PATENT DOCUMENTS

| | | |
|---|---|---|
| AU | 1995034436 | 12/1996 |
| AU | 199744431 B2 | 1/1998 |
| AU | 199737600 B2 | 3/1998 |
| AU | 715160 B2 | 5/1998 |
| AU | 199852725 B2 | 6/1998 |
| AU | 199852063 B2 | 7/1998 |
| AU | 199868072 | 1/1999 |
| AU | 199864810 B2 | 4/1999 |
| AU | 199868064 | 5/1999 |
| AU | 199932941 B2 | 8/1999 |
| AU | 199873974 A1 | 9/1999 |
| AU | 199887118 A1 | 9/1999 |
| AU | 199887911 B2 | 10/1999 |
| AU | 199961796 B2 | 11/1999 |
| AU | 199947586 A1 | 3/2000 |
| AU | 199958760 B2 | 4/2000 |
| AU | 199959547 A1 | 6/2000 |
| AU | 200014942 A1 | 8/2000 |
| AU | 200072507 A1 | 7/2001 |
| AU | 200121249 A1 | 9/2001 |
| AU | 200131331 A1 | 12/2001 |
| AU | 2001288909 B2 | 3/2002 |
| AU | 200197331 A1 | 8/2002 |
| AU | 200224622 A1 | 10/2002 |
| AU | 200234300 A1 | 11/2002 |
| AU | 2002301162 A1 | 6/2003 |
| AU | 2003293127 B2 | 7/2004 |
| AU | 2004200464 A1 | 10/2004 |
| AU | 2004229055 A1 | 5/2005 |
| AU | 2005265120 B2 | 1/2006 |
| AU | 2005248933 B2 | 7/2006 |
| AU | 2006246995 A1 | 11/2006 |
| AU | 2006213940 A1 | 3/2007 |
| AU | 2007214435 A1 | 9/2007 |
| AU | 2008350910 A1 | 8/2009 |
| AU | 2008243171 A1 | 10/2009 |
| AU | 2009202435 B2 | 1/2010 |
| AU | 2010249957 A1 | 11/2010 |
| AU | 2011202517 B2 | 6/2011 |
| AU | 2011244889 A1 | 11/2011 |
| AU | 2013233898 B2 | 9/2013 |
| AU | 2013267542 A1 | 12/2013 |
| AU | 2013213699 A1 | 2/2014 |
| AU | 2013318608 B2 | 3/2014 |
| AU | 2017203507 A1 | 6/2017 |
| EP | 0982209 A1 | 1/2000 |
| EP | 1606154 A1 | 12/2005 |
| NZ | 189408 A | 4/1983 |
| NZ | 216538 A | 9/1987 |
| NZ | 217708 A | 4/1998 |
| NZ | 702290 A | 2/2017 |
| WO | 0222421 A1 | 3/2002 |
| WO | 2004054839 A2 | 7/2004 |
| WO | 2004080775 A1 | 9/2004 |
| WO | 2006122374 A1 | 11/2006 |
| WO | 2010135103 A1 | 11/2010 |
| WO | 2013181189 A1 | 12/2013 |

* cited by examiner

ECP OVERLAY SYSTEM FOR W-TYPE TRIPLE VALVE

CROSS-REFERENCE TO RELATED APPLICATION

This application claims priority to U.S. Provisional Application Ser. No. 62/587,106, filed Nov. 16, 2017, which is hereby incorporated by reference in its entirety.

BACKGROUND OF THE INVENTION

Field of the Invention

The present invention relates to a brake apparatus for railway vehicles and, more particularly, to an ECP overlay system for a W-type triple valve.

Description of Related Art

Railways of Australia has a standardized pneumatic air brake valve control system, known as a W-type triple valve system, which is similar in overall operation to American Association of Railroads (AAR) pneumatic air brake valves (such as the WABCO ABDX control valve), with a pipe bracket, a control valve unit, and a combined reservoir. The W-type, freight pneumatic braking system is a relayed brake system, which utilizes a separate supply reservoir to fill brake cylinder during a brake application.

Brake equipment may include Electronically Controlled Pneumatic (ECP) systems to allow for the electronic control of the brakes rather than pneumatic control. ECP braking systems offer many advantages over pneumatic-only control, including superior braking and safety capabilities. ECP brake equipment on each rail vehicle may include a stand-alone All Electric Manifold (AEM), which contains the pressure transducers, various pneumatic and electro-pneumatic valves, etc. This equipment is used to monitor the pressures in the brake pipe, the brake cylinder(s), and specific reservoirs, and to convert the electrical brake commands into a form usable by a microprocessor. Operating according to its programming code and to the dictation of the brake commands and other electrical signals it has received, the microprocessor controls the electro-pneumatic valves.

AEM units having ECP functionality may be interfaced with existing triple valve equipment, such as the W-type triple valves commonly utilized in Australia, by utilizing a transition plate to provide air-connection between an existing W-type triple valve equipped railcar and an ECP stand-alone AEM. The transition plate enables full ECP S-4200 functionality for the existing triple valve system. The use of the transition plate with the AEM unit, however, does not allow the braking system to operate using either the ECP system or solely using pneumatic control.

SUMMARY OF THE INVENTION

In one aspect, an ECP overlay system for a W-type triple valve includes a manifold body having a pipe bracket face configured to engage a face of a pipe bracket of a railway brake system, a valve face configured to engage a face of a W-type triple valve of a railway brake system, and an electric manifold face. The system further including an electric manifold assembly engaged with the electric manifold face of the manifold body, with the electric manifold assembly having a pneumatic mode where the electric manifold assembly is configured to allow pneumatic-only control of a brake cylinder of a railway brake system and an ECP mode where the electric manifold assembly is configured to allow electronic control of a brake cylinder of a railway brake system.

The manifold body further includes a plurality of ports defined by the pipe bracket face, a plurality of ports defined by the valve face, and a plurality of ports defined by the electric manifold face, with the plurality of ports of the pipe bracket face in fluid communication with the plurality of ports of the valve face via a plurality of passages extending through the manifold body, and the plurality of ports of the electric manifold face in fluid communication with the plurality of passages.

The plurality of ports of the pipe bracket face and the plurality of ports of the valve face may each include an auxiliary reservoir pressure port, an accelerated release reservoir pressure port, a brake pipe pressure port, a brake cylinder pressure port, and a brake cylinder exhaust pressure port. The auxiliary reservoir pressure ports of the pipe bracket face and the valve face are in fluid communication via an auxiliary reservoir pressure passage, the accelerated release reservoir pressure ports of the pipe bracket face and the valve face are in fluid communication via an accelerated release reservoir pressure passage, the brake pipe pressure ports of the pipe bracket face and the valve face are in fluid communication via a brake pipe pressure passage, the brake cylinder pressure ports of the pipe bracket face and the valve face are in fluid communication via a brake cylinder pressure passage, and the brake cylinder exhaust pressure ports of the pipe bracket face and the valve face are in fluid communication via a brake cylinder exhaust pressure passage.

A plurality of ports of the electric manifold face may include an auxiliary reservoir pressure port, a brake pipe pressure port, a brake cylinder pressure port, and a brake cylinder exhaust pressure port. The auxiliary reservoir pressure port of the electric manifold face is in fluid communication with the auxiliary reservoir pressure passage, the brake pipe pressure port of the electric manifold face is in fluid communication with the brake pipe pressure passage, the brake cylinder pressure port of the electric manifold face is in fluid communication with the brake cylinder pressure passage, and the brake cylinder exhaust pressure port of the electric manifold face is in fluid communication with the brake cylinder exhaust pressure passage.

The electric manifold assembly may include a cut-out valve, a fill valve, and a brake cylinder exhaust valve, with the cut-out valve, the fill valve and the brake cylinder exhaust valve each having an open position and closed position. When the electric manifold assembly is in the ECP mode with the fill valve in the open position and the cut-out valve and the brake cylinder exhaust valve each in the closed position, the fill valve is configured to place an auxiliary reservoir passage in fluid communication with a brake cylinder pressure passage. The fill valve may be configured to place an auxiliary reservoir passage in fluid communication with a brake cylinder pressure passage via a brake cylinder fill choke. When the electric manifold assembly is in the ECP mode with the brake cylinder exhaust valve in the open position and the fill valve in the closed position, the brake cylinder exhaust valve may be configured to place a brake cylinder pressure passage in fluid communication with atmospheric pressure. The brake cylinder exhaust valve may be configured to place a brake cylinder pressure passage in fluid communication with atmospheric pressure via a brake cylinder exhaust choke. The cut-out valve, the fill valve, and the brake cylinder exhaust valve may be electronically-controlled via a cut-out solenoid, a fill solenoid, and a brake cylinder exhaust solenoid, respectively.

The cut-out valve, the fill valve, and the brake cylinder exhaust valve may each be embodied as a diaphragm check valve, with the cut-out valve biased to the open position, the fill valve biased to the closed position, the brake cylinder exhaust valve biased to the open position. The cut-out solenoid, the fill solenoid, and the brake cylinder exhaust solenoid are each configured to supply pneumatic pressure to the respective cut-out valve, the fill valve, and the brake cylinder exhaust valve to maintain the cut-out valve, the fill valve, and the brake cylinder exhaust valve in the closed position.

When the electric manifold assembly is in the pneumatic mode, the cut-out valve may be in the open position to place a brake cylinder exhaust passage in fluid communication with atmospheric pressure, the fill valve is in the closed position, and the brake cylinder exhaust valve is in the closed position. The electric manifold assembly may further include an auxiliary reservoir pressure transducer, a brake pipe pressure transducer, and a brake cylinder pressure transducer.

The manifold body may be configured to be positioned between a pipe bracket and a W-type triple valve with the electric manifold face facing a direction extending away from freight vehicle body.

Further details and advantages of the various embodiments of the invention detailed herein will become clear upon reviewing the following detailed description of the preferred embodiments in conjunction with the accompanying drawing figures.

DETAILED DESCRIPTION

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

Figure 1:
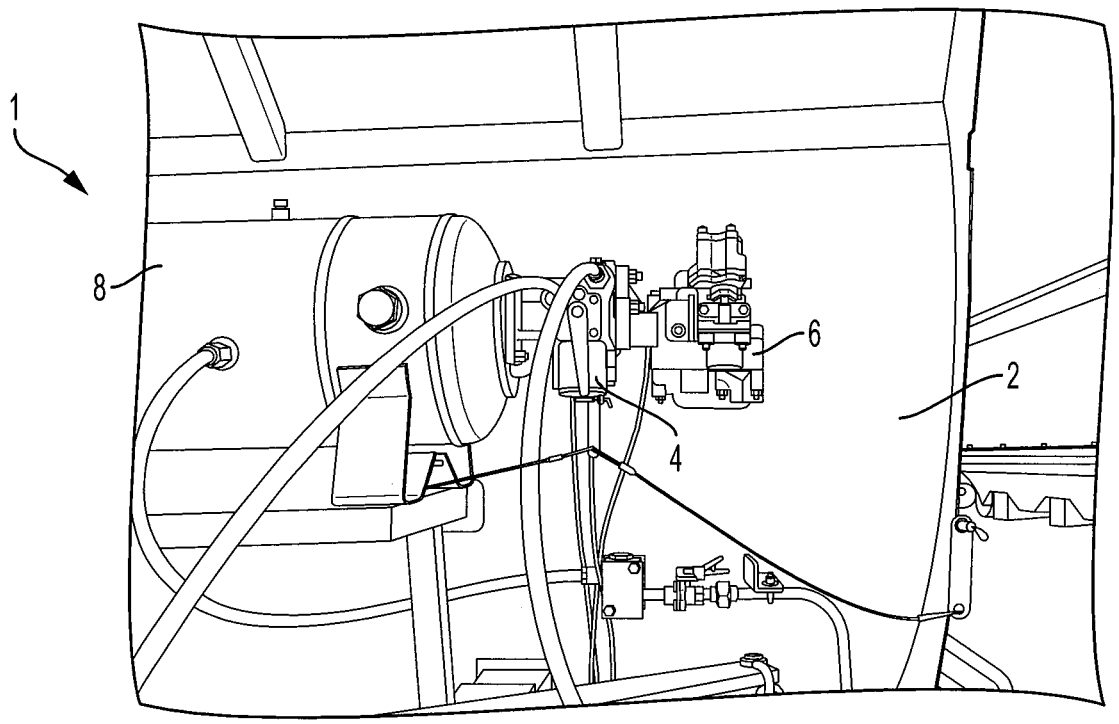
FIG. 1 is a front view of a conventional W-type relayed freight braking system.
Figure 2:
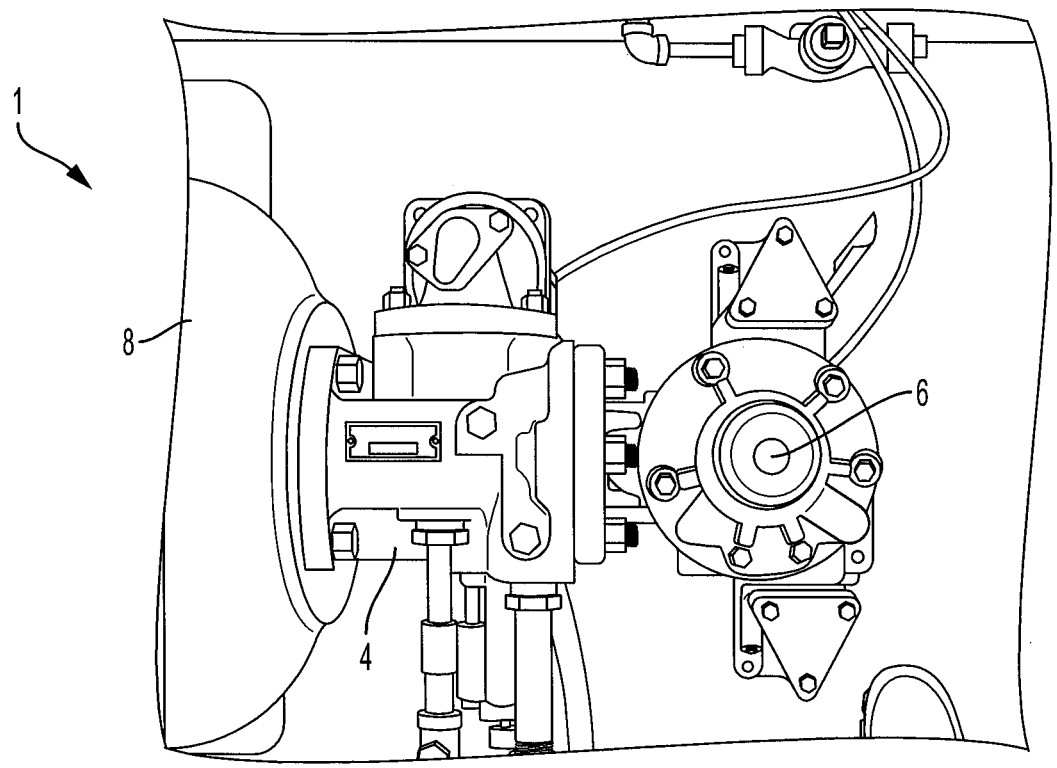
FIG. 2 is a top view of the braking system of FIG. 1.

Referring to FIGS. 1 and 2, a conventional W-type triple valve brake system 1 for a single railway freight car 2. The W-type triple valve brake system 1 includes a pipe bracket 4 having various pipes attached thereto for establishing a pneumatic connection between the various components of the W-type triple valve system 1 to a W-type triple valve unit 6 interfacing with the pipe bracket 4. The W-type triple valve unit 6 is in communication with a combined reservoir 8 that contains a supply of pressurized air. The flow of the pressurized air between various locations within the W-type triple valve brake system 1 is controlled by the W-type triple valve unit 6 to perform various brake valve functions. In a typical W-type triple valve system, the cars are operated as a Tandem-Pair, with each car being approximately 17 meters in length. The brake system arrangement is a relayed system, i.e., one control portion pressure output is relayed from the reservoir to the brake cylinders on each car.

Referring to FIGS. 3-6 and 10-13, an ECP overlay system 10 for a W-type triple valve is shown. More specifically, the ECP overlay system 10 is configured to be utilized in connection with a WF5 triple valve, although the ECP overlay system 10 may also be utilized in connection with various W-type triple valves. The ECP overlay system 10 includes a manifold body 12 and an electric manifold assembly 14 as discussed in more detail below.

Referring to FIGS. 3-6, the manifold body 12 is configured to be positioned between the pipe bracket 4 and the W-type triple valve 6 shown in FIGS. 1-2. The manifold body 12 includes a pipe bracket face 16 configured to engage a face of the pipe bracket 4 of the W-type triple valve brake system 1, a valve face 18 configured to engage a face of the W-type triple valve 6 of the W-type triple valve brake system 1, and an electric manifold mounting face 20 configured to engage the electric manifold assembly 14. The pipe bracket face 16 defines an auxiliary reservoir pressure port 22, an accelerated release reservoir pressure port 24, a brake pipe pressure port 26, a brake cylinder pressure port 28, and a brake cylinder exhaust port 30. The valve face 18 also defines an auxiliary reservoir pressure port 32, an accelerated release reservoir pressure port 34, a brake pipe pressure port 36, a brake cylinder pressure port 38, and a brake cylinder exhaust pressure port 40. The auxiliary reservoir pressure ports 22, 32 of the pipe bracket face 16 and the valve face 18 are in fluid communication via an auxiliary reservoir pressure passage 42. The accelerated release reservoir pressure ports 24, 34 of the pipe bracket face 16 and the valve face 18 are in fluid communication via an accelerated release reservoir pressure passage 44. The brake pipe pressure ports 26, 36 of the pipe bracket face 16 and the valve face 18 are in fluid communication via a brake pipe pressure passage 46. The brake cylinder pressure ports 28, 38 of the pipe bracket face 16 and the valve face 18 are in fluid communication via a brake cylinder pressure passage 48. The brake cylinder exhaust ports 30, 40 of the pipe bracket face 16 and the valve face 18 are in fluid communication via a brake cylinder exhaust passage 50.

Figure 3:
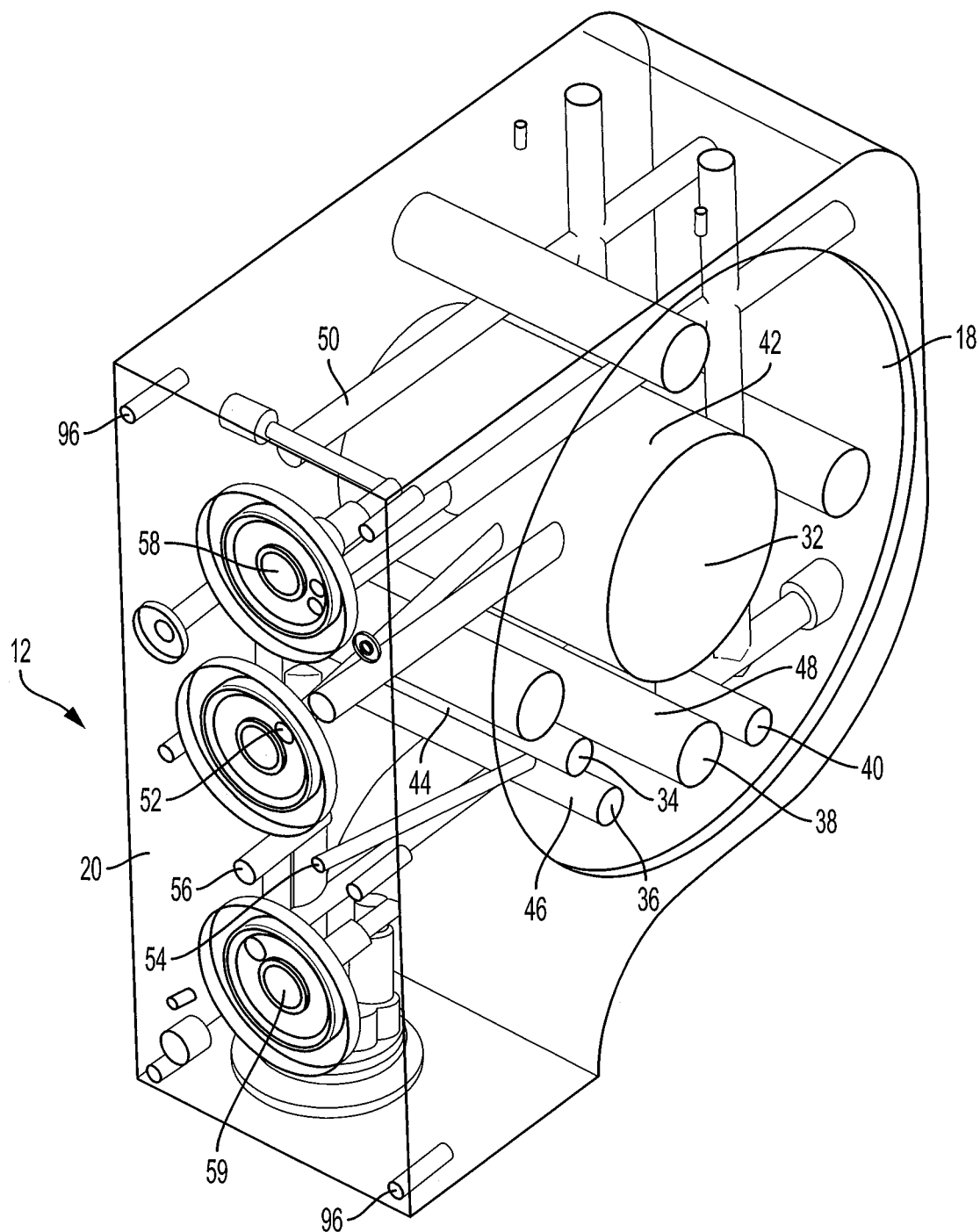
FIG. 3 is a left perspective view of an ECP overlay manifold system for a W-type relayed freight brake system according to one aspect of the present invention, showing internal porting connections.
Figure 4:
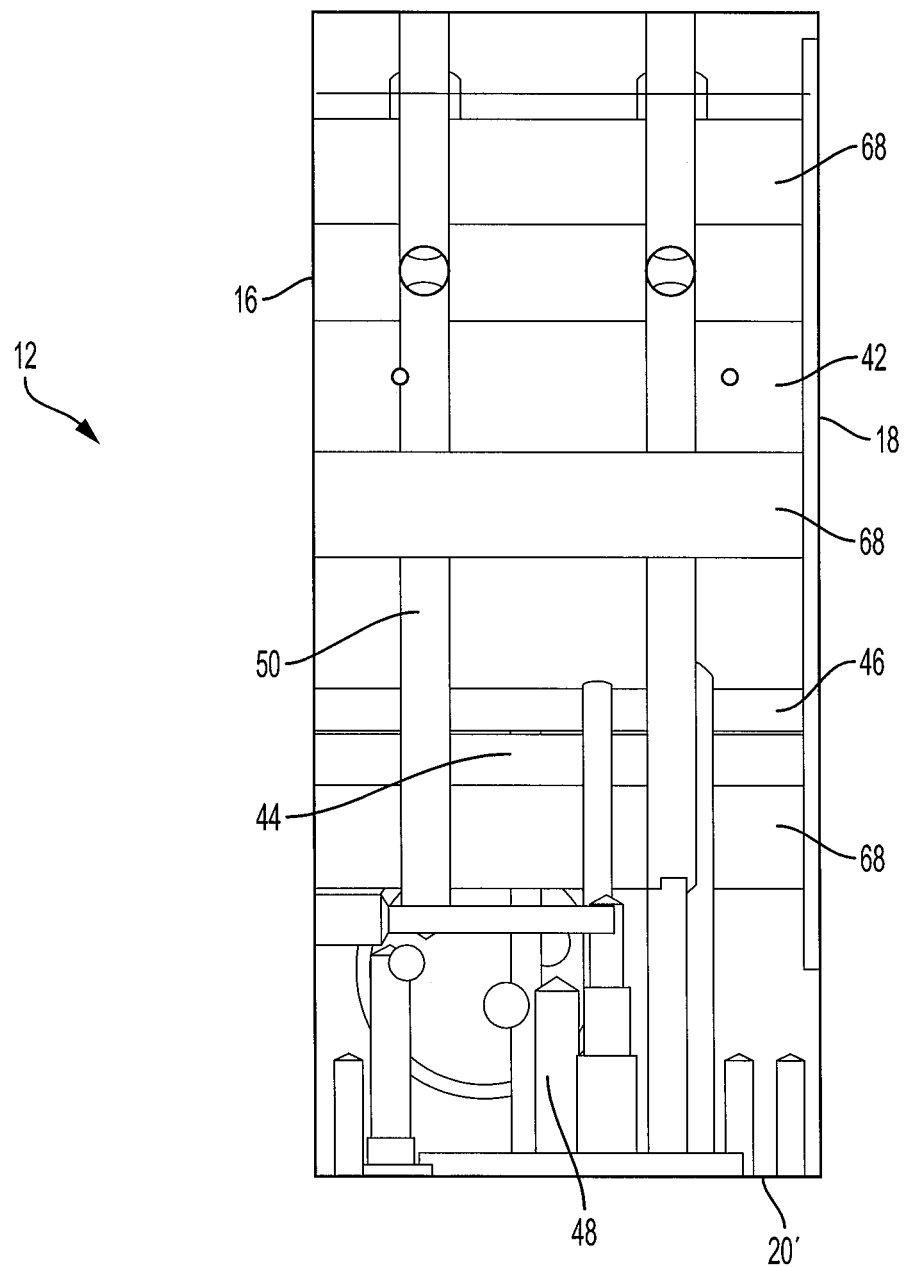
FIG. 4 is a top view of the W-type ECP overlay manifold system of FIG. 3, showing internal porting connections.
Figure 5:
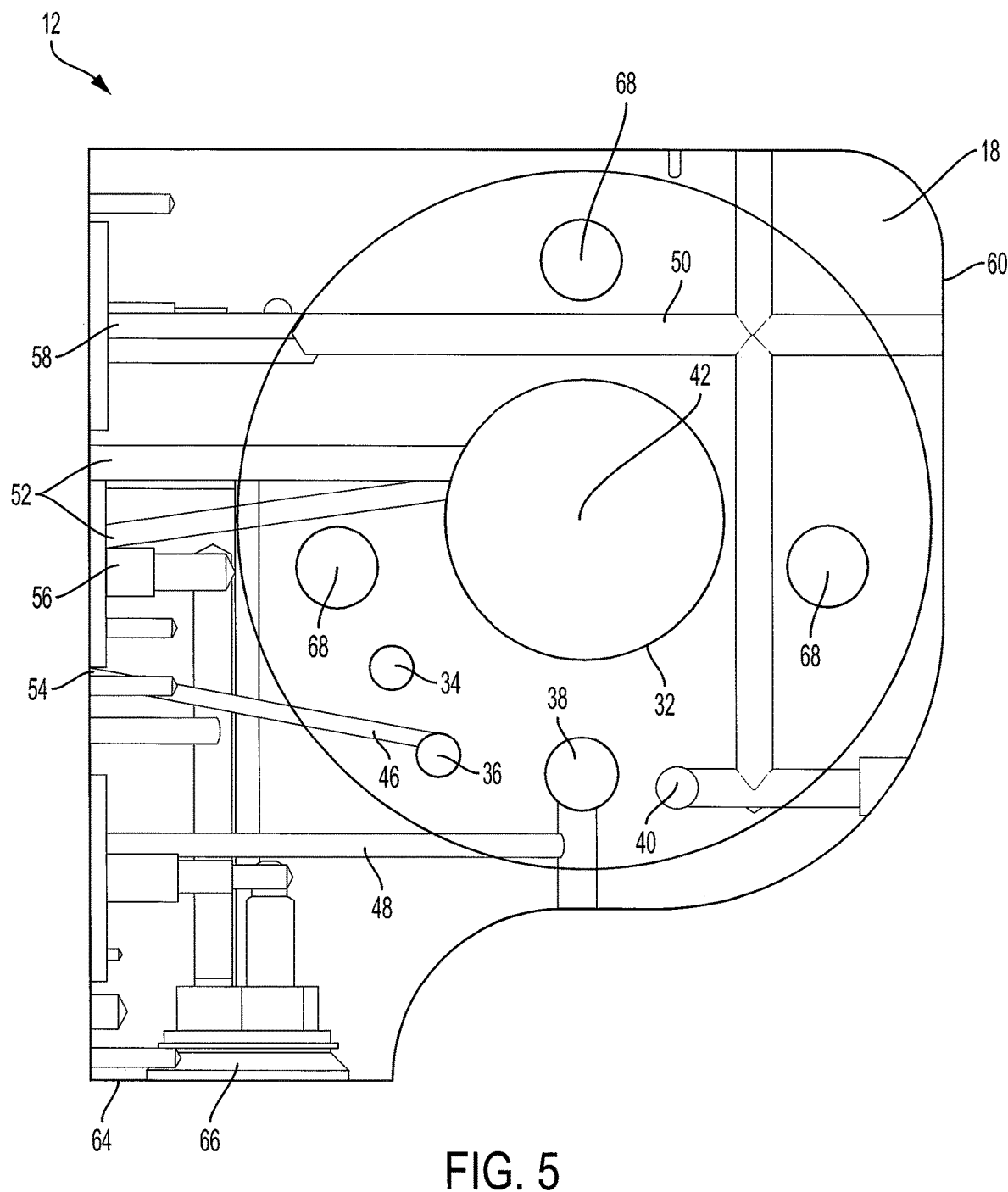
FIG. 5 is a side view of the ECP overlay system of FIG. 3, showing internal porting connections.
Figure 6:
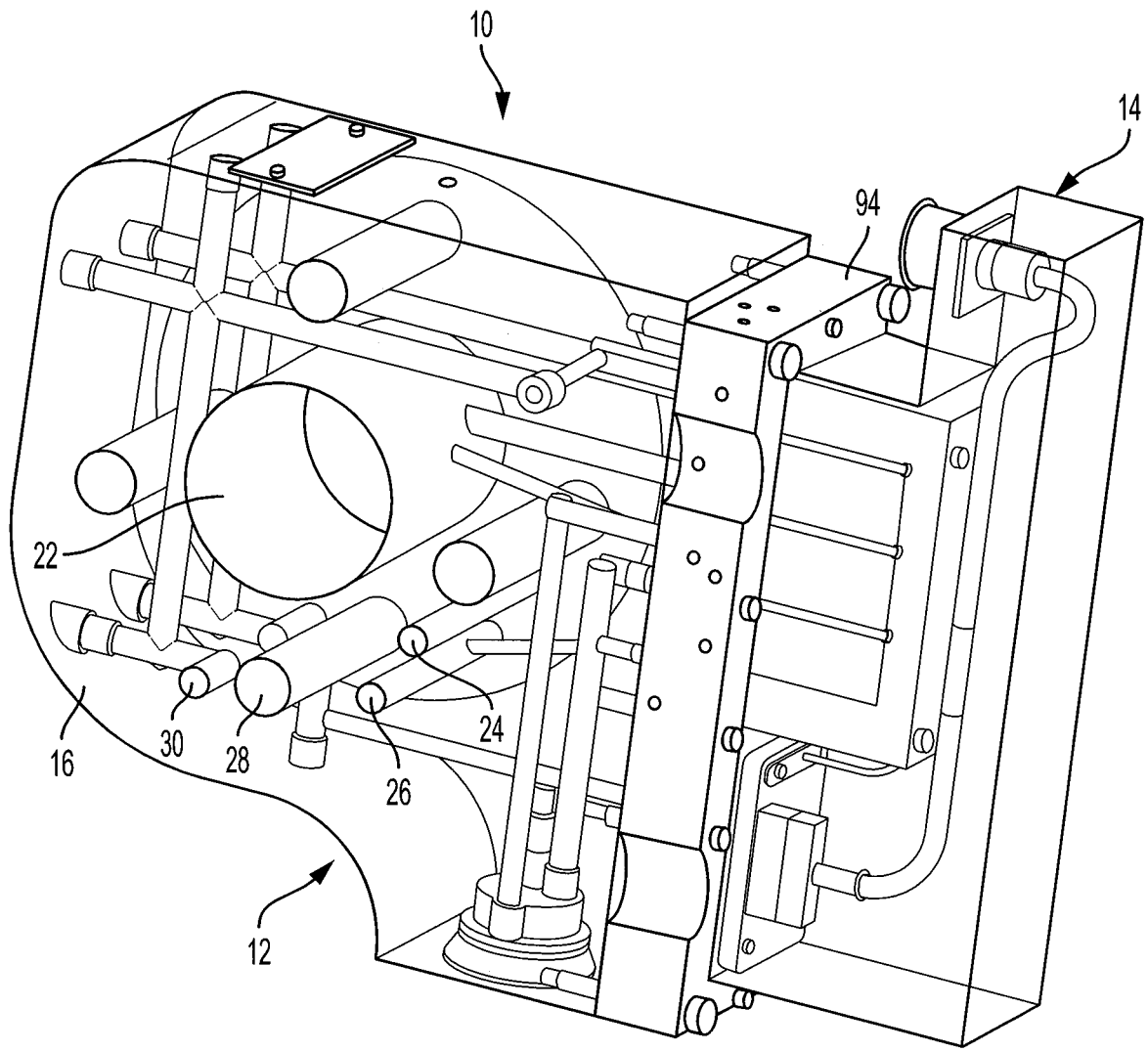
FIG. 6 is a right perspective view of the ECP overlay system of FIG. 3, showing internal porting connections and an ECP coin plate.

Referring to FIGS. 3-5, the electric manifold face 20 also includes an auxiliary reservoir pressure port 52, a brake pipe pressure port 54, a brake cylinder pressure port 56, and a brake cylinder exhaust pressure port 58. The auxiliary reservoir pressure port 52 of the electric manifold face 20 is in fluid communication with the auxiliary reservoir pressure passage 42, the brake pipe pressure port 54 of the electric manifold face 20 is in fluid communication with the brake pipe pressure passage 46, the brake cylinder pressure port 56 of the electric manifold face 20 is in fluid communication with the brake cylinder pressure passage 48, and the brake cylinder exhaust pressure port 58 of the electric manifold face 20 is in fluid communication with the brake cylinder exhaust pressure passage 50. The manifold body 12 also includes an auxiliary face 60 positioned opposite from the electric manifold face 20. Further, the manifold body 12 includes a brake cylinder exhaust face 64, which is positioned about perpendicular to the electric manifold face 20. The brake cylinder exhaust face 64 defines a brake cylinder exhaust port 66 that is in fluid communication with the brake cylinder passage 48.

Referring again to FIGS. 3-5, the manifold body 12 further defines a plurality of mounting openings 68 configured to receive a fastener (not shown) for securing the manifold body 12 to the pipe bracket 4 and to the W-type triple valve 6. In particular, the fasteners may extend through a flange in the triple valve 6 and extend further through the manifold body 12 for securing to the pipe bracket 4, although other suitable mounting arrangements may be utilized. The manifold body 12 is configured to be positioned with the electric manifold face 20 facing in a direction extending away from the freight vehicle body 2, although other suitable orientations may be utilized.

Figure 7:
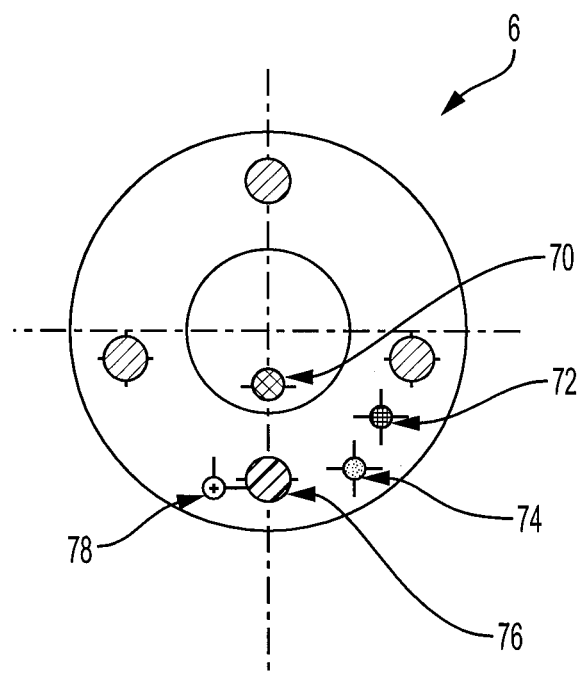
FIG. 7 is a schematic view of a mounting face of a W-type triple valve.
Figure 8:
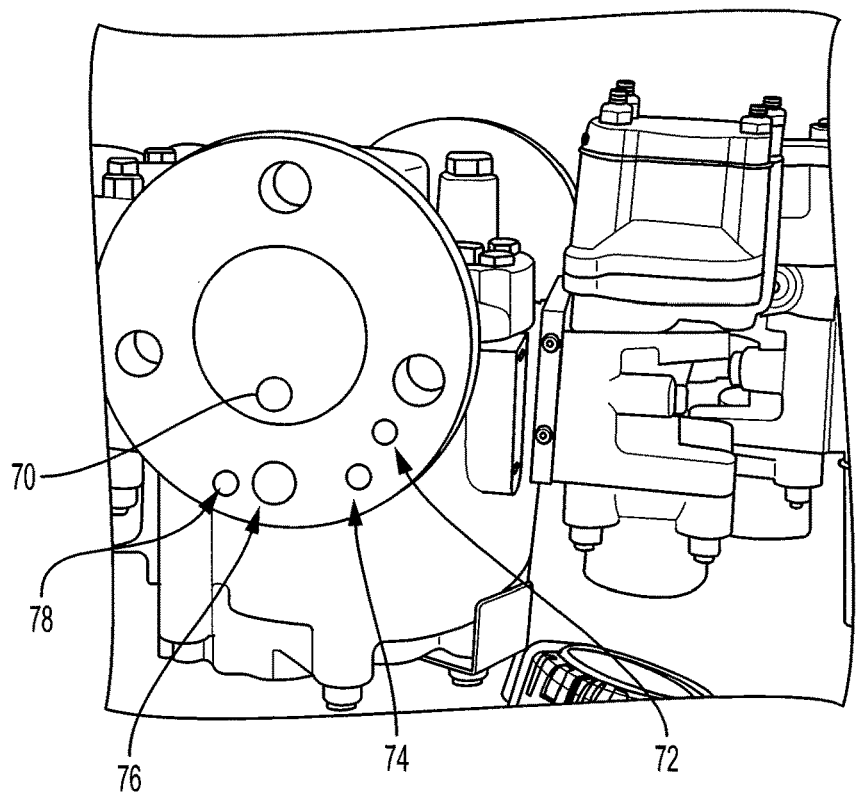
FIG. 8 is a front view of a mounting face of a W-type triple valve.
Figure 9:
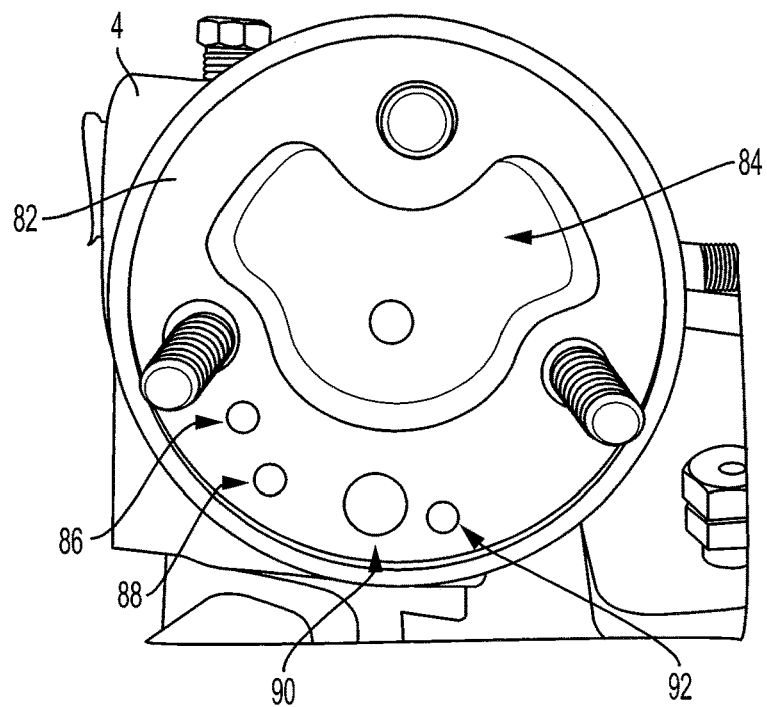
FIG. 9 is a front view of a mounting face of a type W.R. pipe bracket.

Referring to FIGS. 7-9, the conventional pipe bracket 4 for the triple valve system 1 includes a mounting face 82 for securing to the triple valve 6. The mounting face 82 includes an auxiliary reservoir pressure port 84, an accelerated release reservoir pressure port 86, a brake pipe pressure port 88, a brake cylinder pressure port 90, and a brake cylinder exhaust pressure port 92 that are configured to be aligned with the corresponding ports 22, 24, 26, 28, 30 of the pipe bracket face 16 of the manifold body 12 discussed above. Similarly, as shown in FIGS. 7 and 8, the ports 32, 34, 36, 38, 40 of the valve face 18 of the manifold body 12 are configured to align with corresponding ports 70, 72, 74, 76, 78 of the W-type triple valve 6. Accordingly, the manifold body 12 allows for the fluid communication between the pipe bracket 4 and the W-type triple valve 6 while providing access to the various pressures of the ECP overlay system 10 via the electric manifold face 20 for ECP functionality.

Referring to FIGS. 3, 6, and 10-13, the electric manifold assembly 14 is engaged with the electric manifold face 20 of the manifold body 12. The electric manifold assembly 14 may include a coin plate 94 secured to the manifold body 12 via mounting openings 96. The coinplate 94 includes an electronic circuit board, three solenoid valves (mizer-type), three pressure transducers, various rubber seals, and an aluminum manifold base that contains porting for brake pipe, auxiliary reservoir, brake cylinder, and brake cylinder exhaust, although other suitable coinplate arrangements may be utilized. The electric manifold assembly 14 has a pneumatic mode (ECP cut-out) where the electric manifold assembly 14 is configured to allow the W-type triple valve 6 to have pneumatic-only control of a brake cylinder of railway brake system and an ECP mode (ECP cut-in) where the electric manifold assembly 14 is configured to allow electronic control to either fill and/or exhaust a brake cylinder of a railway brake system. The ECP overlay system 10 may be employed in connection with an AEM available from WABTEC Corporation, although the overlay system 10 may be utilized in connection with other ECP systems.

Figure 10:
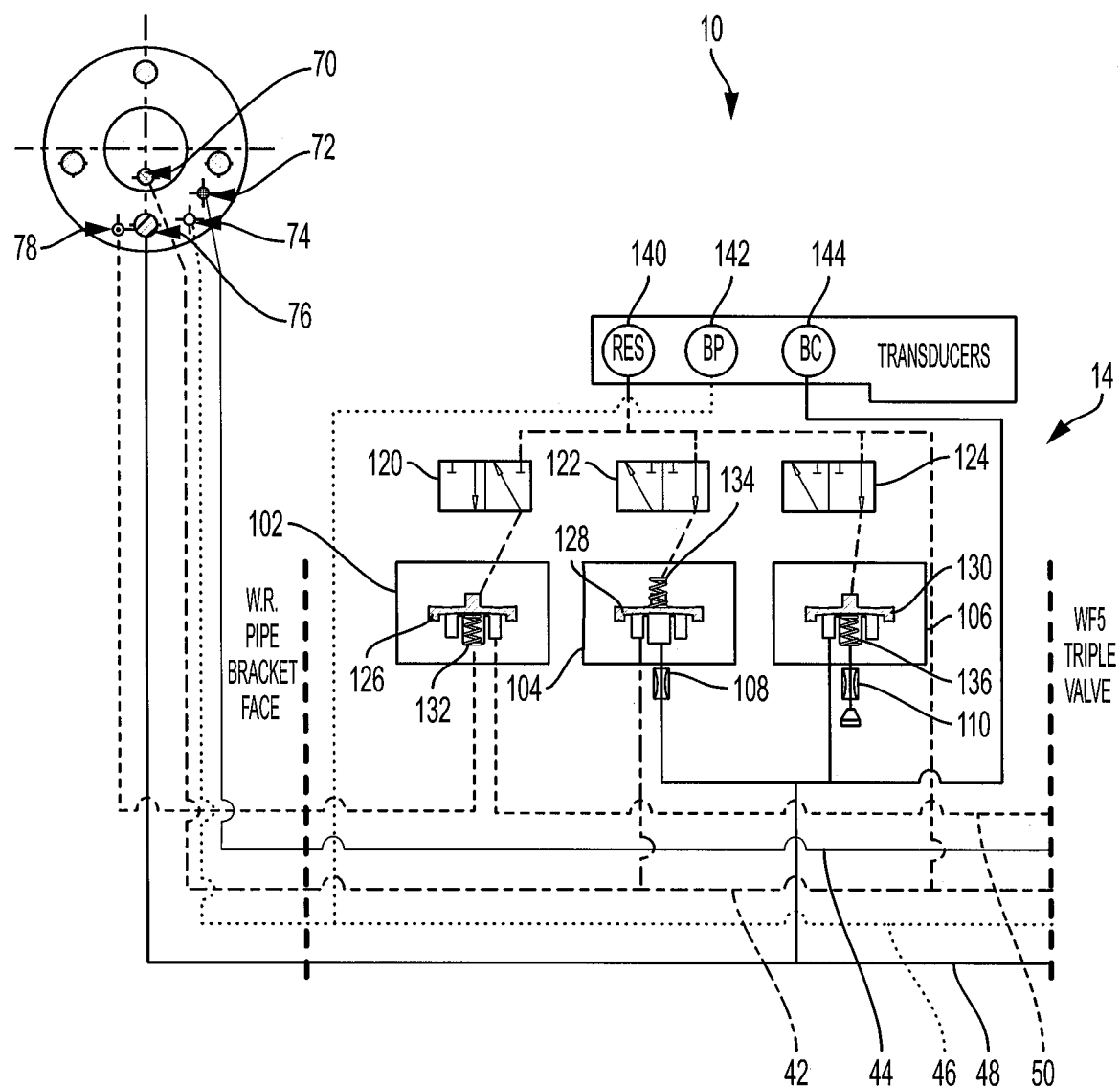
FIG. 10 is a schematic view of an ECP overlay system according to one aspect of the present invention, showing the system in a pneumatic mode (ECP in a cut-out position).
Figure 11:
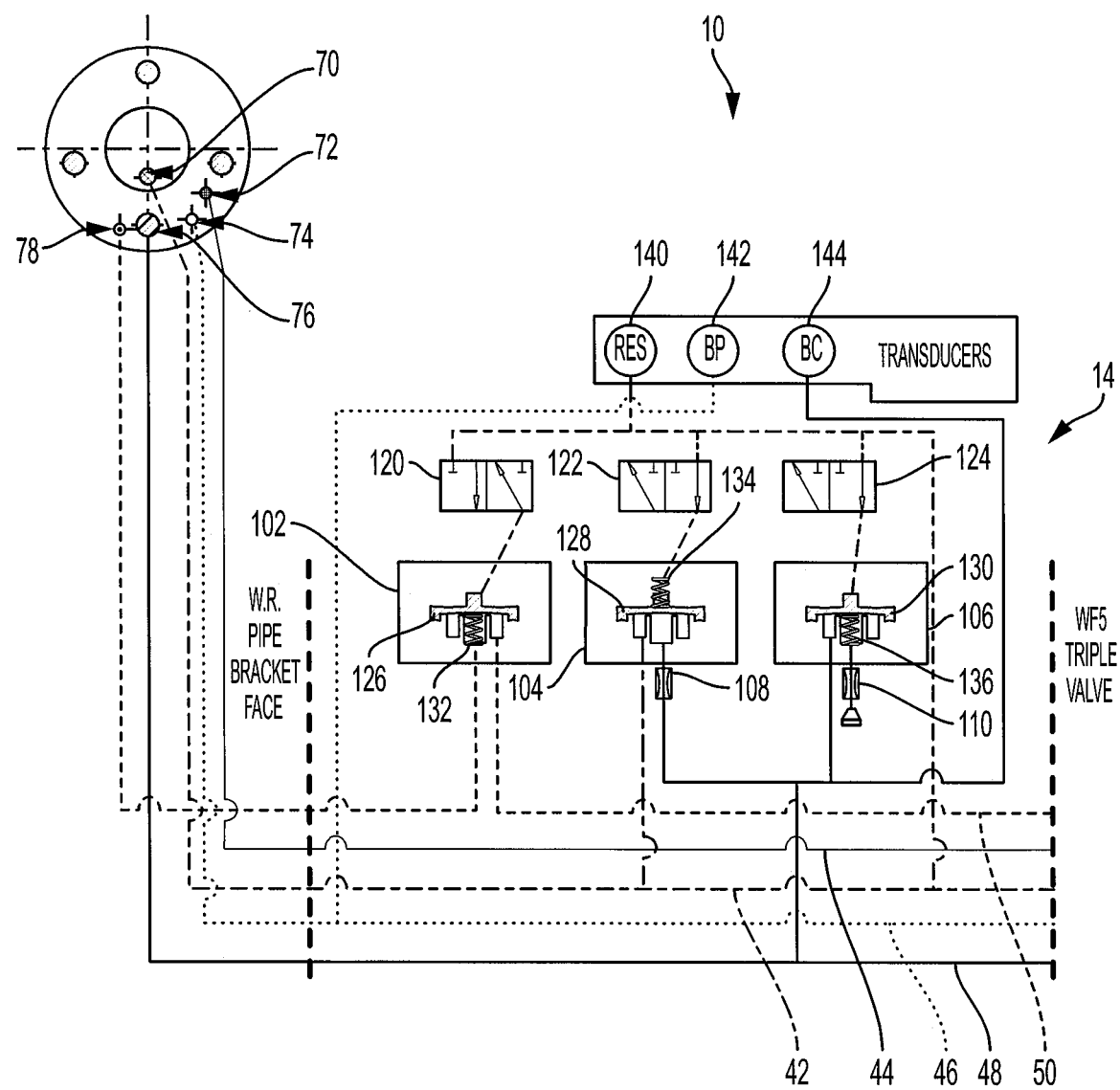
FIG. 11 is a schematic view of the ECP overlay system of FIG. 10, showing the system in an ECP cut-in position and full release position.
Figure 12:
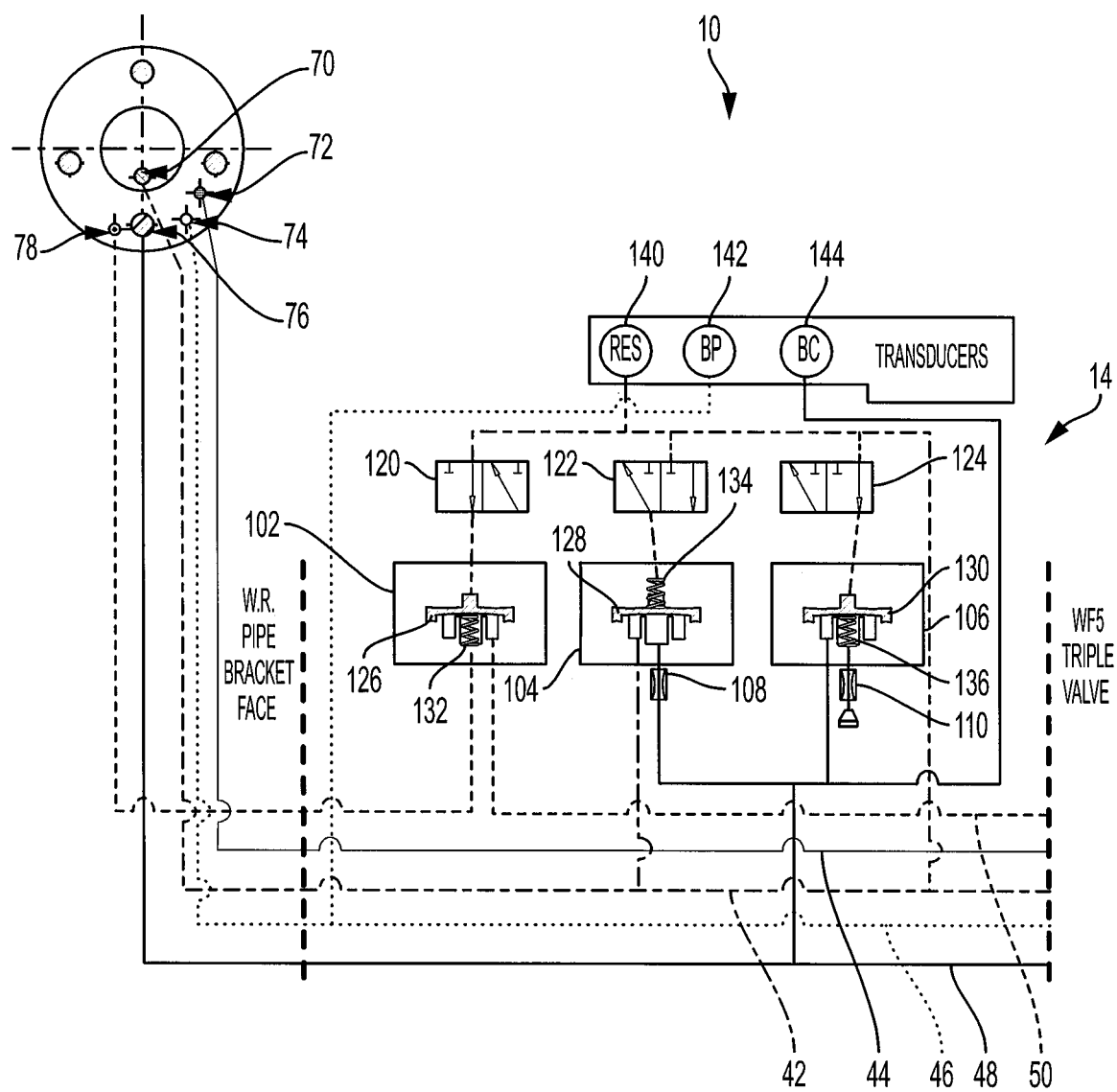
FIG. 12 is a schematic view of the ECP overlay system of FIG. 10, showing the system in an ECP cut-in position and brake application position.
Figure 13:
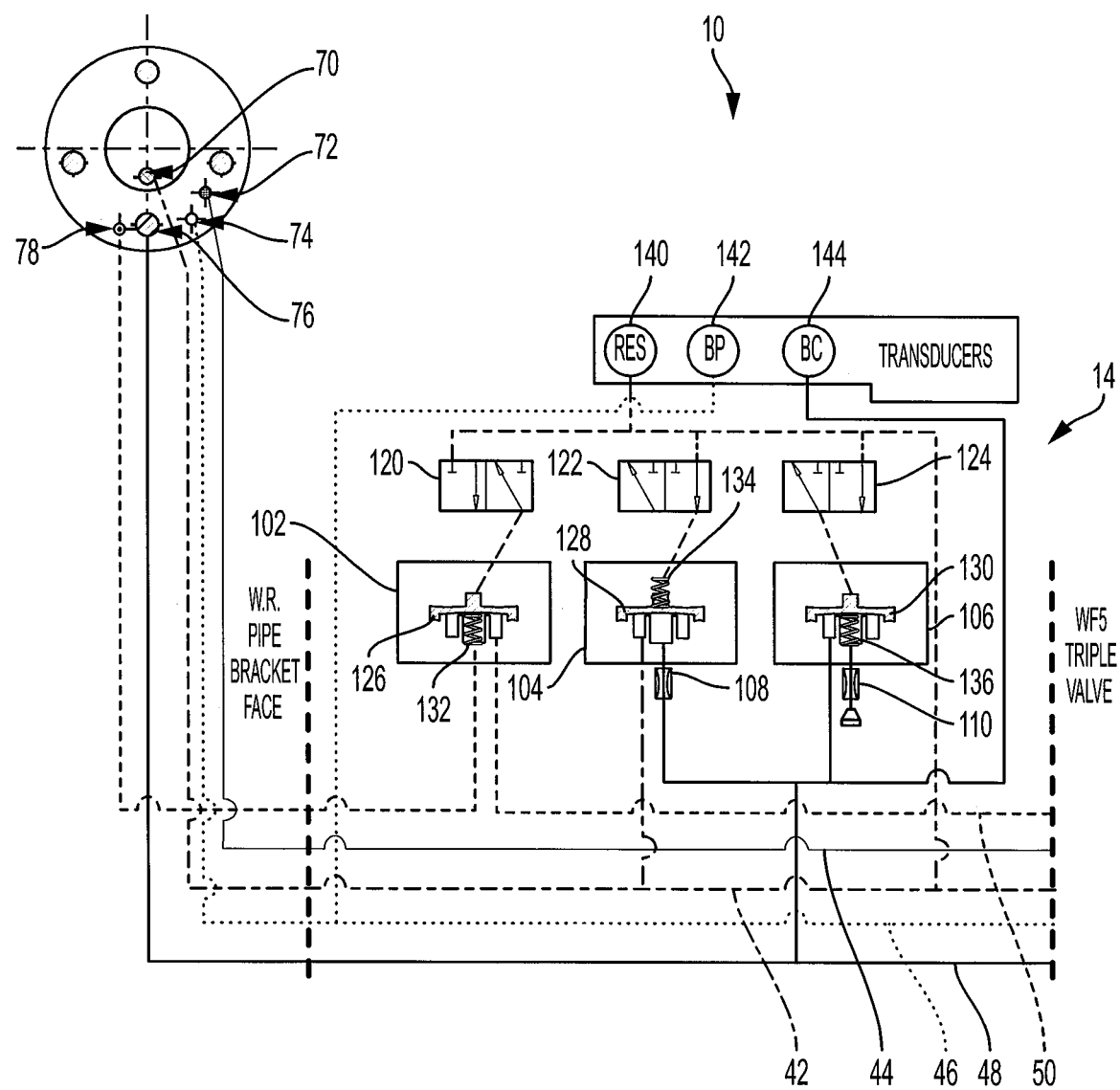
FIG. 13 is a schematic view of the ECP overlay system of FIG. 10, showing the system in an ECP cut-in position and brake release position.

Referring to FIGS. 10-13, the electric manifold assembly 14 includes a cut-out valve 102, a fill valve 104, and a brake cylinder exhaust valve 106. The cut-out valve 102, the fill valve 104, and the brake cylinder exhaust valve 106 each have an open position (diaphragm check valve unseated) and closed position (diaphragm check valve seated). When the electric manifold assembly 14 is in the ECP mode (cut-in) with the fill valve 104 in the open position and the cut-out valve 102 and the brake cylinder exhaust valve 106 each in the closed position, as shown in FIG. 12, the fill valve 104 is configured to place the auxiliary reservoir passage 42 in fluid communication with the brake cylinder pressure passage 48. As discussed in more detail below, the ECP overlay system 10 shown in FIG. 12 is in ECP mode (ECP cut-in) during a brake application. The fill valve 104 is configured to place the auxiliary reservoir passage 42 in fluid communication with the brake cylinder pressure passage 48 via a brake cylinder fill choke 108. When the electric manifold assembly 14 is in the ECP mode (ECP cut-in) with the brake cylinder exhaust valve 106 in the open position and the fill valve 104 in the closed position, as shown in FIG. 13, the brake cylinder exhaust valve 106 is configured to place the brake cylinder pressure passage 48 in fluid communication with atmospheric pressure. In particular, the brake cylinder exhaust valve 106 is configured to place the brake cylinder pressure passage 48 in fluid communication with atmospheric pressure via a brake cylinder exhaust choke 110. The cut-out valve 102 is in the open position thus keeping the brake cylinder exhaust path 50 through the W-type triple valve 6 open to atmosphere. When the electric manifold assembly 14 is in the pneumatic mode, as shown in FIG. 10, the cut-out valve 102 is in the open position to place the brake cylinder exhaust passage 50 in fluid communication with atmospheric pressure, the fill valve 104 is in the closed position, and the brake cylinder exhaust valve 106 is in the closed position.

The cut-out valve 102, the fill valve 104, and the brake cylinder exhaust valve 106 are electronically-controlled via a cut-out solenoid 120, a fill solenoid 122, and a brake cylinder exhaust solenoid 124, respectively. The cut-out valve 102, the fill valve 104, and the brake cylinder exhaust valve 106 are each diaphragm check valves having a diaphragm 126, 128, 130, although other suitable valve arrangements may be utilized. The cut-out valve 102 is biased to the open position, the fill valve 104 is biased to the closed position, and the brake cylinder exhaust valve 106 is biased to the open position. The cut-out valve 102, the fill valve 104, and the brake cylinder exhaust valve 106 may be biased to their respective position via respective springs 132, 134, 136, although other suitable arrangements may be utilized. The cut-out solenoid 120, the fill solenoid 122, and the brake cylinder exhaust solenoid 124 are each configured to supply pneumatic pressure to the respective cut-out valve 102, the fill valve 104, and the brake cylinder exhaust valve 106 to maintain the cut-out valve 102, the fill valve 104, and the brake cylinder exhaust valve 106 in the closed position. As shown in FIGS. 10-13, the pneumatic pressure may be pressure from the auxiliary reservoir passage 42 supplied via the solenoids 120, 122, 124 to the respective diaphragms 126, 128, 130 of the valves 102, 104, 106. Opening and closing of the solenoids 120, 122, 124 controls whether the auxiliary reservoir passage 42 pressure acts on the diaphragms 126, 128, 130 of the valves 102, 104, 106 thereby controlling whether the valves 102, 104, 106 are in the open or closed position.

The cut-out valve 102 is in fluid communication with the brake cylinder exhaust passage 50 and is configured to place the W-type triple valve 6 in fluid communication with the brake cylinder exhaust passage 50 when the cut-out valve 102 is in the open position. The W-type triple valve 6 is isolated from the brake cylinder exhaust port 92 of the pipe bracket 4 when the cut-out valve 102 is in the closed position (cut-out solenoid 120 is energized). The fill valve 104 is in fluid communication with the auxiliary reservoir passage 42 and the brake cylinder passage 48 with the auxiliary reservoir passage 42 being in fluid communication with the brake cylinder passage 48 when the fill valve 104 is in the open position (fill solenoid 122 is energized). The auxiliary reservoir passage 42 is isolated from the brake cylinder passage 48 when the fill valve 104 is in the closed position (fill solenoid 122 is de-energized). The brake cylinder exhaust valve 106 is in fluid communication with the brake cylinder passage 48 and atmospheric pressure via the brake cylinder exhaust choke 110. The brake cylinder pressure passage 48 is in fluid communication with atmospheric pressure with the brake cylinder exhaust valve 106 in the open position (exhaust solenoid 124 energized). The brake cylinder pressure passage 48 is isolated from atmospheric pressure when the brake cylinder exhaust valve 106 is in the closed position (exhaust solenoid 124 de-energized).

Referring again to FIGS. 10-13, the electric manifold assembly 14 further includes an auxiliary reservoir pressure transducer 140, a brake pipe pressure transducer 142, and a brake cylinder pressure transducer 144 to measure the respective pressures of the passages 42, 46, 48.

Pneumatic Mode

Referring to FIG. 10, the electric manifold assembly 14 is in pneumatic mode to provide for pneumatic-only control of the brake system 1. In pneumatic mode, the electric manifold assembly 14 is electronically cut out and the W-type triple valve 6 provides the feed of auxiliary reservoir 42 pressure to the brake cylinder 48. The cut-out valve 102 is in the open position (cut-out solenoid 120 de-energized) to allow the brake cylinder exhaust passage 50 from the W-type triple valve 6 to vent to atmosphere. The fill valve 104 and the brake cylinder exhaust valve 106 are in the closed position (fill solenoid 122 and brake cylinder exhaust solenoid 124 de-energized) and pressurized on their seats by the auxiliary reservoir passage 42 pressure via the solenoids 122, 124 thereby isolating the auxiliary reservoir passage 42 from the brake cylinder pressure passage 48 as well as isolating the brake cylinder pressure passage 48 from atmosphere via the brake cylinder exhaust valve 106. Accordingly, the W-type triple valve 6 is pneumatically responsible for applying and releasing the brake on the freight vehicle based on manipulations of brake pipe pressure in the train.

ECP Mode in Release Position

Referring to FIG. 11, the electric manifold assembly 14 is in ECP mode (electronically cut-in) to provide electronic control of the brake system 1 with the W-type triple valve 6 in the release position. The electric manifold assembly 14 is placed in ECP mode electronically. The brake pipe of the train and the brake pipe passage 46 are maintained at the system supply charge pressure such that the W-type triple valve 6 never develops a pressure differential required internally in the W-type triple valve 6 to initiate a brake application, thereby keeping the W-type triple valve 6 in the release position. The cut-out valve 102 is in the open position (cut-out solenoid 120 de-energized) to allow the brake cylinder exhaust passage 50 from the W-type triple valve 6 to vent to atmosphere. In a release position in ECP mode, the fill valve 104 and the brake cylinder exhaust valve 106 are in the closed position (fill solenoid 122 and brake cylinder exhaust solenoid 124 de-energized) and pressurized on their seats by the auxiliary reservoir passage 42 pressure via the solenoids 122, 124 thereby isolating the auxiliary reservoir passage 42 from the brake cylinder passage 48 as well as isolating the brake cylinder passage 48 from atmosphere via the brake cylinder exhaust valve 106.

ECP Mode in Application Position

Referring to FIG. 12, the electric manifold assembly 14 is in ECP mode (electronically cut-in) to provide electronic control of the brake system 1 with the ECP overlay system 10 in an application position. When in ECP mode, the assembly 14 electronically controls auxiliary reservoir pressure passage 42. The brake pipe of the train and the brake pipe passage 46 are maintained at the system supply charge pressure such that the W-type triple valve 6 never develops a pressure differential required internally to initiate a brake application thereby keeping the W-type triple valve 6 in the release position.

While in ECP mode and when a signal for electronic braking is obtained, the cut-out valve 102 is moved to the closed position (cut-out solenoid 120 energized) and held on its seat by pressure from the auxiliary reservoir passage 42 via the cut-out solenoid 120. In other words, the cut-out solenoid 120 is actuated to allow the flow of air from the auxiliary reservoir passage 42 to the top side of the diaphragm 126 of the cut-out valve 102 to move the cut-out valve 102 to the closed position. The fill valve 104 is moved to the open position by electronically energizing the fill solenoid 122 to isolate the flow of air from the auxiliary reservoir passage 42 to the top side of the diaphragm 128 of the fill valve 104 thereby allowing the pressure from the auxiliary reservoir passage 42 to overcome the biasing force of the spring 134 of the fill valve 104 to unseat the diaphragm 128. With the fill valve 104 in the open position, pressure from the auxiliary reservoir passage 42 is directed to the brake cylinder passage 48 via the brake cylinder fill choke 108 to initiate a brake application. The brake cylinder exhaust valve 106 remains in the closed position (brake cylinder exhaust solenoid 124 remains de-energized) and pressurized on its seat by the auxiliary reservoir passage 42 pressure via the brake cylinder exhaust solenoid 124 thereby isolating the brake cylinder passage 48 from atmosphere via the brake cylinder exhaust valve 106. Once the target brake cylinder pressure is obtained, the fill solenoid 122 is de-energized, thus allowing the fill valve 104 to close on its seat to terminate the flow of auxiliary reservoir 42 into the brake cylinder passage 48.

ECP Mode in Releasing Position

Referring to FIG. 13, the electric manifold assembly 14 is in ECP mode (electronically cut-in) to provide electronic control of the brake system 1 with the ECP overlay system 10 in a brake releasing position. The brake pipe of the train and the brake pipe passage 46 are maintained at the system supply charge pressure such that the W-type triple valve 6 never develops a pressure differential required internally to initiate a brake application thereby keeping the W-type triple valve 6 in the release position. While in ECP mode and when the signal to release brake cylinder pressure is obtained by the electric manifold assembly 14, the fill valve 104 is already in its closed position, where auxiliary reservoir passage 42 is isolated from the brake cylinder passage 48. The cut-out valve 102 is moved to the open position by de-energizing the cut-out solenoid 120 to exhaust auxiliary reservoir pressure 42 acting on the top side of diaphragm 126 to atmosphere with the biasing force of the spring 132 unseating diaphragm 126. The brake cylinder exhaust valve 106 is moved to the open position thereby allowing brake cylinder pressure to vent to atmosphere via the brake cylinder exhaust choke 110 to release the brake application.

The brake cylinder exhaust valve 106 is moved to the open position by electronically energizing the brake cylinder exhaust solenoid 124 to isolate and vent to atmosphere the pressure from the auxiliary reservoir passage 42 from the top of the diaphragm 130 of the brake cylinder exhaust valve 106. When brake cylinder pressure reaches approximately 11 psi in brake cylinder pressure passage 48, the brake cylinder exhaust valve 106 is moved back to its closed position by de-energizing the brake cylinder exhaust solenoid 124 until brake cylinder pressure reaches approximately 5 psi in brake cylinder pressure passage 48. The brake cylinder exhaust valve 106 is re-opened by energizing brake cylinder exhaust solenoid 124 once again until brake cylinder pressure reaches 0 psi in the brake cylinder pressure passage 48 with the brake cylinder exhaust valve 106 moving back to its closed position by de-energizing the brake cylinder exhaust solenoid 124.

While embodiments of a transition plate for converting a pneumatically-controlled braking system were provided in the foregoing description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. An ECP overlay system, comprising:
    a manifold body comprising a pipe bracket face configured to engage a face of a pipe bracket of a vehicle brake system, a valve face configured to engage a face of a W-type triple valve of a vehicle brake system, and an electric manifold face;
    an electric manifold assembly engaged with the electric manifold face of the manifold body, the electric manifold assembly having a pneumatic mode where the electric manifold assembly is configured to allow pneumatic-only control of a brake cylinder of a vehicle brake system and an ECP mode where the electric manifold assembly is configured to allow electronic control of a brake cylinder of a vehicle brake system,
    wherein the manifold body further comprises a plurality of ports defined by the pipe bracket face, a plurality of ports defined by the valve face, and a plurality of ports defined by the electric manifold face, the plurality of ports of the pipe bracket face are in fluid communication with the plurality of ports of the valve face via a plurality of passages extending through the manifold body, the plurality of ports of the electric manifold face are in fluid communication with the plurality of passages,
    wherein the plurality of ports of the pipe bracket face and the plurality of ports of the valve face each comprise an auxiliary reservoir pressure port, an accelerated release reservoir pressure port, a brake pipe pressure port, a brake cylinder pressure port, and a brake cylinder pressure exhaust port, the auxiliary reservoir pressure ports of the pipe bracket face and the valve face are in fluid communication via an auxiliary reservoir pressure passage, the accelerated release reservoir pressure ports of the pipe bracket face and the valve face are in fluid communication via an accelerated release reservoir pressure passage, the brake pipe pressure ports of the pipe bracket face and the valve face are in fluid communication via a brake pipe pressure passage, the brake cylinder pressure ports of the pipe bracket face and the valve face are in fluid communication via a brake cylinder pressure passage, the brake cylinder exhaust ports of the pipe bracket face and the valve face are in fluid communication via a brake cylinder exhaust passage.

2. The system of claim 1, wherein a plurality of ports of the electric manifold face comprise an auxiliary reservoir pressure port, a brake pipe pressure port, a brake cylinder pressure port, and a brake cylinder exhaust port, the auxiliary reservoir pressure port of the electric manifold face is in fluid communication with the auxiliary reservoir pressure passage, the brake pipe pressure port of the electric manifold face is in fluid communication with the brake pipe pressure passage, the brake cylinder pressure port of the electric manifold face is in fluid communication with the brake cylinder pressure passage, and the brake cylinder exhaust port of the electric manifold face is in fluid communication with the brake cylinder exhaust passage.

3. The system of claim 2, wherein the electric manifold assembly comprises a cut-out valve, a fill valve, and a brake cylinder exhaust valve, the cut-out valve, the fill valve, and the brake cylinder exhaust valve each having an open position and closed position, and wherein, when the electric manifold assembly is in the ECP mode with the fill valve in the open position and the cut-out valve and the brake cylinder exhaust valve each in the closed position, the fill valve is configured to place the auxiliary reservoir passage in fluid communication with the brake cylinder pressure passage.

4. The system of claim 3, wherein the fill valve is configured to place the auxiliary reservoir passage in fluid communication with the brake cylinder pressure passage via a brake cylinder fill choke.

5. The system of claim 3, wherein, when the electric manifold assembly is in the ECP mode with the brake cylinder exhaust and cut-out valves in the open position and the fill valve in the closed position, the brake cylinder exhaust valve is configured to place the brake cylinder pressure passage in fluid communication with atmospheric pressure.

6. The system of claim 5, wherein the brake cylinder exhaust valve is configured to place the brake cylinder pressure passage in fluid communication with atmospheric pressure via a brake cylinder exhaust choke.

7. The system of claim 3, wherein the cut-out valve, the fill valve, and the brake cylinder exhaust valve are electronically-controlled via a cut-out solenoid, a fill solenoid, and a brake cylinder exhaust solenoid, respectively.

8. The system of claim 7, wherein the cut-out valve, the fill valve, and the brake cylinder exhaust valve each comprise a diaphragm check valve, the cut-out valve biased to the open position, the fill valve biased to the closed position, the brake cylinder exhaust valve biased to the open position, the cut-out solenoid, the fill solenoid, and the brake cylinder exhaust solenoid each in fluid communication with the auxiliary reservoir passage and configured to supply air from the auxiliary reservoir passage to the respective cut-out valve, the fill valve, and the brake cylinder exhaust valve to maintain the cut-out valve, the fill valve, and the brake cylinder exhaust valve in the closed position.

9. The system of claim 3, wherein, when the electric manifold assembly is in the pneumatic mode, the cut-out valve is in the open position to place the brake cylinder exhaust passage in fluid communication with atmospheric pressure, the fill valve is in the closed position, and the brake cylinder exhaust valve is in the closed position.

10. The system of claim 1, wherein the electric manifold assembly comprises a cut-out valve, a fill valve, and a brake cylinder exhaust valve, the cut-out valve, the fill valve and the brake cylinder exhaust valve each having an open position and closed position, and wherein, when the electric manifold assembly is in the ECP mode with the fill valve in the open position and the cut-out valve and the brake cylinder exhaust valve each in the closed position, the fill valve is configured to place an auxiliary reservoir passage in fluid communication with a brake cylinder pressure passage.

11. The system of claim 10, wherein the fill valve is configured to place an auxiliary reservoir passage in fluid communication with a brake cylinder pressure passage via a brake cylinder fill choke.

12. The system of claim 10, wherein, when the electric manifold assembly is in the ECP mode with the brake cylinder exhaust and cut-out valves in the open position and the fill valve in the closed position, the brake cylinder exhaust valve is configured to place a brake cylinder pressure passage in fluid communication with atmospheric pressure.

13. The system of claim 12, wherein the brake cylinder exhaust valve is configured to place a brake cylinder pressure passage in fluid communication with atmospheric pressure via a brake cylinder exhaust choke.

14. The system of claim 10, wherein the cut-out valve, the fill valve, and the brake cylinder exhaust valve are electronically-controlled via a cut-out solenoid, a fill solenoid, and a brake cylinder exhaust solenoid, respectively.

15. The system of claim 14, wherein the cut-out valve, the fill valve, and the brake cylinder exhaust valve each comprise a diaphragm check valve, the cut-out valve biased to the open position, the fill valve biased to the closed position, the brake cylinder exhaust valve biased to the open position, the cut-out solenoid, the fill solenoid, and the brake cylinder exhaust solenoid each configured to supply pneumatic pressure to the respective cut-out valve, the fill valve, and the brake cylinder exhaust valve to maintain the cut-out valve, the fill valve, and the brake cylinder exhaust valve in the closed position.

16. The system of claim 10, wherein, when the electric manifold assembly is in the pneumatic mode, the cut-out valve is in the open position to place a brake cylinder exhaust passage in fluid communication with atmospheric pressure, the fill valve is in the closed position, and the brake cylinder exhaust valve is in the closed position.

17. The system of claim 10, wherein the electric manifold assembly further comprises an auxiliary reservoir pressure transducer, a brake pipe pressure transducer, and a brake cylinder pressure transducer.

18. The system of claim 1, wherein the manifold body is configured to be positioned between a pipe bracket and a W-type triple valve with the electric manifold face facing a direction extending away from a vehicle body.

* * * * *